(12) United States Patent
Ohira et al.

(10) Patent No.: US 12,314,055 B2
(45) Date of Patent: May 27, 2025

(54) INFORMATION PROCESSING APPARATUS AND INFORMATION PROCESSING METHOD

(71) Applicant: CANON KABUSHIKI KAISHA, Tokyo (JP)

(72) Inventors: Shinji Ohira, Tokyo (JP); Masakazu Fujiki, Kanagawa (JP); Daisuke Kotake, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 17/870,686

(22) Filed: Jul. 21, 2022

(65) Prior Publication Data

US 2023/0032367 A1  Feb. 2, 2023

(30) Foreign Application Priority Data

Jul. 29, 2021  (JP) .................................. 2021-123979

(51) Int. Cl.
*G05D 1/00* (2024.01)
*G06T 7/70* (2017.01)

(52) U.S. Cl.
CPC ......... *G05D 1/0246* (2013.01); *G05D 1/0044* (2013.01); *G06T 7/70* (2017.01)

(58) Field of Classification Search
CPC ...... G05D 1/0246; G05D 1/024; G05D 1/022; G05D 1/246; G05D 1/0231; G05D 1/00; G05D 3/00; G05D 2107/60; G05D 2107/70; G05D 1/0274; G05D 1/0212; G05D 1/0044; G05D 1/0251; G05D 1/02; G06T 2207/30244; G06T 7/73; G06T 7/70; G06T 7/80; G06T 2207/30168; G06T 7/20; G06T 2207/10032; G01C 21/206; G01C 21/165; G01C 21/32; G01C 21/005;

(Continued)

(56) References Cited

U.S. PATENT DOCUMENTS 11,314,254 B2 * 4/2022 Macias .............. G01C 21/3837
11,592,826 B2 * 2/2023 Huang ................. G05D 1/0221
(Continued)

FOREIGN PATENT DOCUMENTS

CN  105953798 A  * 9/2016 ............. G05D 1/024
JP  2020166702 A  * 10/2020

OTHER PUBLICATIONS

Translation of JP-2020166702-a (Year: 2020).*
Translation of CN 105953798 A (Year: 2016).*

*Primary Examiner* — Adam R Mott
*Assistant Examiner* — James Miller Watts, III
(74) *Attorney, Agent, or Firm* — Canon U.S.A., Inc., IP Division

(57) ABSTRACT

An information processing apparatus including at least one memory storing instructions and at least one processor that, upon execution of the instructions, is configured to acquire, based on a measurement value measured by a sensor attached to a moving object, information about a position and an orientation of the moving object and a reliability of position/orientation estimation, generates, based on the position and the orientation and the reliability, a reliability map including the reliability for each orientation of the sensor, and determines the orientation of the moving object with the sensor such that the reliability increases, based on the generated reliability map.

10 Claims, 7 Drawing Sheets

(58) Field of Classification Search
CPC ............ G01C 21/1656; G01C 21/1652; G01C 21/3626; G01C 21/3804; G01C 21/26
See application file for complete search history.

(56) References Cited

U.S. PATENT DOCUMENTS

| | | | |
|---|---|---|---|
| 11,720,117 B1* | 8/2023 | Kim | G01C 21/383 |
| | | | 701/23 |
| 11,774,983 B1* | 10/2023 | Zhang | G05D 1/0272 |
| | | | 701/28 |
| 2019/0204092 A1* | 7/2019 | Wheeler | G05D 1/021 |
| 2020/0284590 A1* | 9/2020 | Chen | G01C 21/3841 |
| 2021/0014642 A1* | 1/2021 | Taira | G01C 21/32 |
| 2021/0095992 A1* | 4/2021 | Kitaura | G06T 7/579 |
| 2021/0150755 A1* | 5/2021 | Gao | G06T 7/73 |
| 2021/0278217 A1* | 9/2021 | Kato | G01C 21/30 |

* cited by examiner

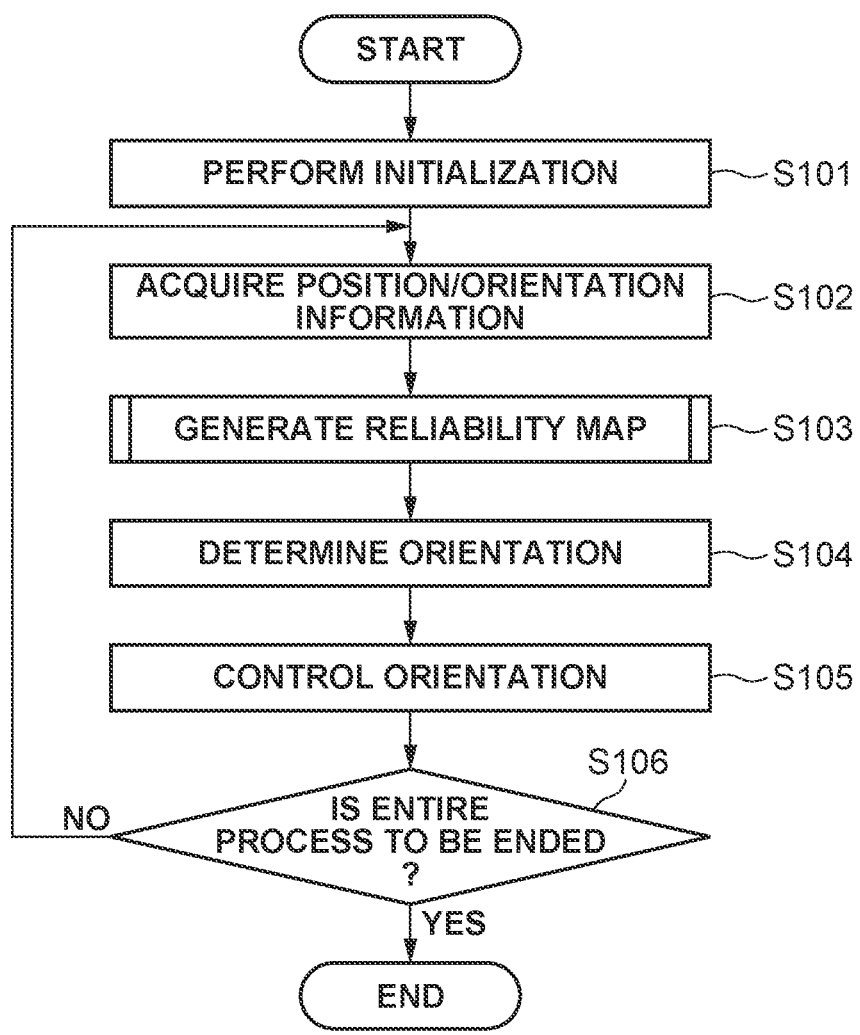

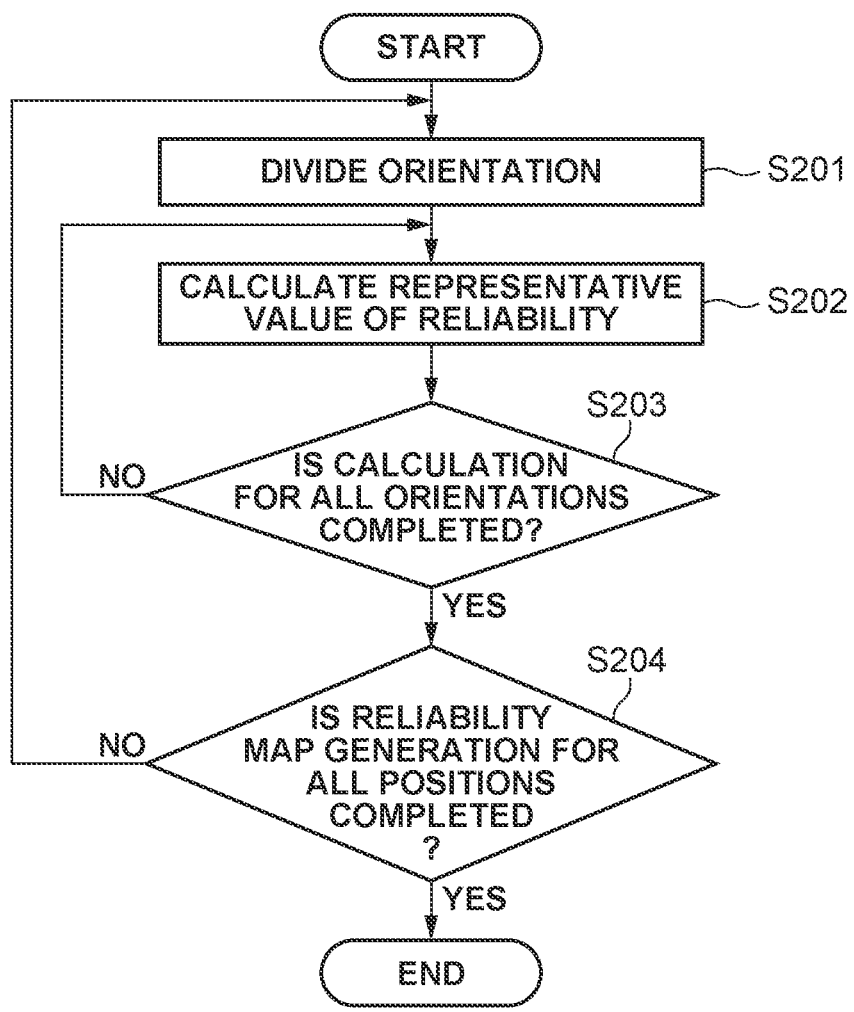

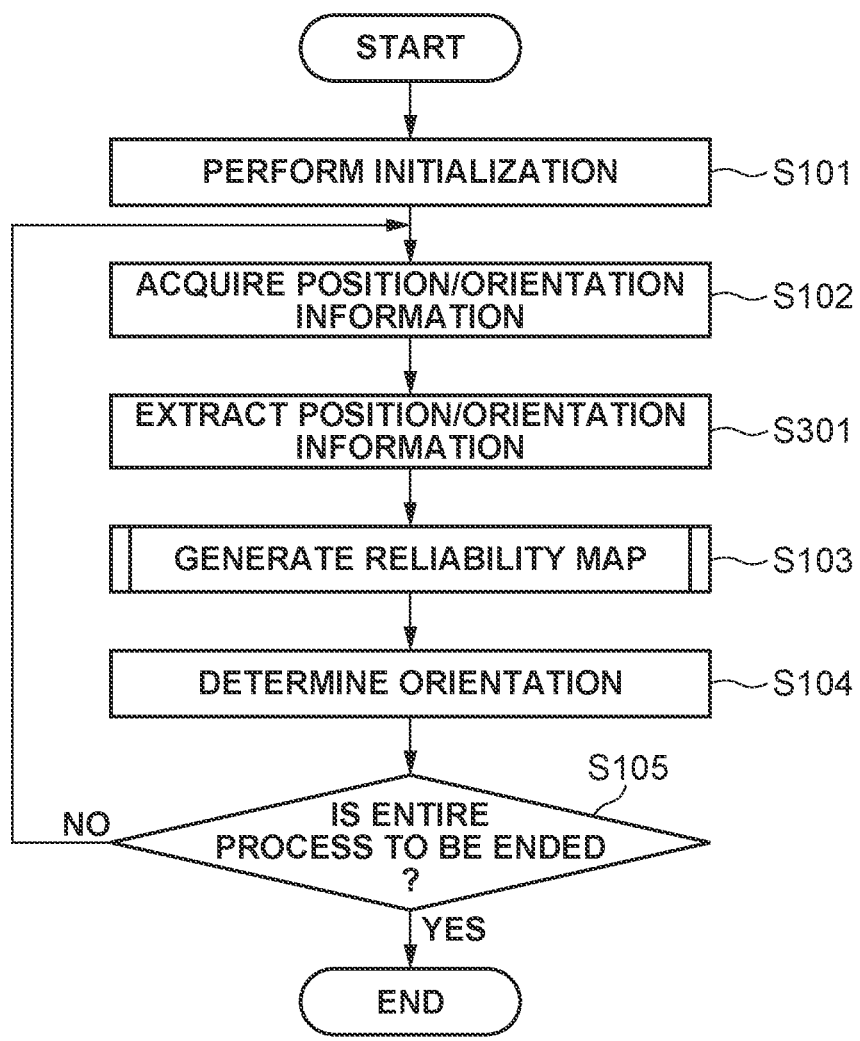

INFORMATION PROCESSING APPARATUS AND INFORMATION PROCESSING METHOD

BACKGROUND

Field

The present disclosure relates to a technique for controlling an orientation of a moving object.

Description of the Related Art

Using position and orientation estimation of a moving object, such as a vehicle (e.g., automated guided vehicle (AGV)), has been discussed to enable the moving object to move autonomously in an environment, such as a factory or a warehouse. When a moving object moves autonomously, it is desirable that the moving object travels through a route where position and orientation estimation of the moving object can be performed with great accuracy. Thus, for example, Japanese Patent Application Laid-Open No. 2020-166702 discusses a method that includes generating reliability map data associating positions in a space with respective reliabilities of the position and orientation estimation, determining a high-reliability region with a reliability higher than or equal to a threshold value by referring to the reliability map data, and generating a route that passes through the high-reliability region.

According to the method discussed in Japanese Patent Application Laid-Open No. 2020-166702, however, a region determined as a low-reliability region of the position and orientation estimation is excluded from a travelable region to disable regions having low reliabilities and the moving object is allowed to travel through only regions having high reliabilities of the position and orientation estimation.

SUMMARY

According to an aspect of the present disclosure, an information processing apparatus including at least one memory storing instructions, and at least one processor that, upon execution of the instructions, is configured to operate as: an acquisition unit configured to acquire, based on a measurement value measured by a sensor attached to a moving object, information about a position and an orientation of the moving object and a reliability of position/orientation estimation, a generation unit configured to generate, based on the position and the orientation and the reliability, a reliability map including the reliability of each orientation of the sensor, and a determination unit configured to determine the orientation of the moving object with the sensor, based on the reliability map generated by the generation unit such that the reliability becomes higher than or equal to a predetermined value during control of a movement of the moving object.

Further features of the present disclosure will become apparent from the following description of exemplary embodiments with reference to the attached drawings.

BRIEF DESCRIPTION OF THE DRAWINGS

FIG. 3 is a flowchart illustrating a process that is performed by the information processing apparatus according to the first exemplary embodiment.

FIG. 4 is a flowchart illustrating a process that is performed by a generation unit according to the first exemplary embodiment.

FIG. 7 is a flowchart illustrating a process that is performed by an information processing apparatus according to a second exemplary embodiment.

DESCRIPTION OF THE EMBODIMENTS

Controlling a moving object that conveys goods in a warehouse according to an exemplary embodiment of the present disclosure will be described below as an example.

A warehouse according to the present exemplary embodiment is a warehouse where a plurality of moving objects and/or a plurality of persons works and each of the plurality of moving objects repeatedly travels through a route assigned to the moving object in the warehouse. In the warehouse, the number and distribution of feature points detected from images captured by cameras attached to the moving objects are changed by a change in an illumination environment, e.g., turning on/off lights, or a change in an image capturing environment, such as a change in layout of goods on shelves. The changes can influence the accuracy of position and orientation estimations. In a case where a reliability of position and orientation estimation is high, accuracy and stability of the position and orientation estimation are also often high. Even among images captured at the same position, the images vary due to different camera orientations during the image capturing, and consequently the reliabilities vary among different camera orientations. Each camera orientation is linked with the orientation of the moving object.

A method for enabling stable traveling according to the present exemplary embodiment will be described below. Specifically, the method includes generating a reliability map for each orientation at a position in a space and determining an orientation of a moving object such that a reliability of position and orientation estimation is higher than or equal to a predetermined threshold value, during control of a movement of the moving object using the reliability map.

A position and an orientation of a moving object according to the present exemplary embodiment refer to three parameters that are a combination of two parameters (X, Y) representing a position on a two-dimensional plane and one parameter ($\theta$) representing an orientation of the moving object.

Figure 1:
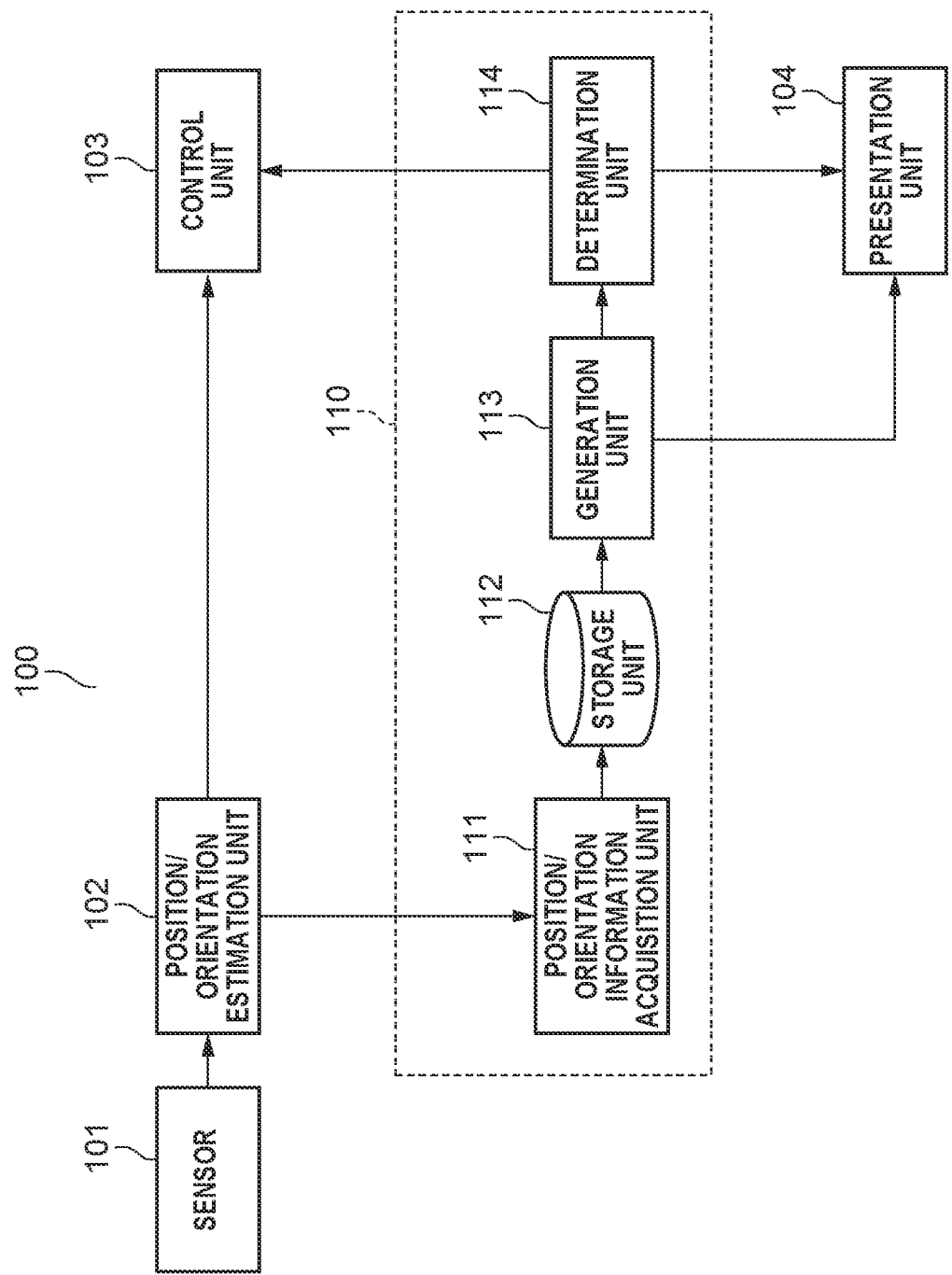
FIG. 1 is a block diagram illustrating an example of a functional configuration of an information processing apparatus according to a first exemplary embodiment.

FIG. 1 is a diagram illustrating an example of a configuration of a moving object that includes an information processing apparatus according to the present exemplary embodiment.

A moving object system 100 includes a sensor 101, a position/orientation estimation unit 102, a control unit 103, and an information processing apparatus 110. Further, the information processing apparatus 110 includes a position/ orientation information acquisition unit 111, a storage unit 112, a generation unit 113, and a determination unit 114. According to the present exemplary embodiment, the sensor 101 is a camera that captures images.

The position/orientation estimation unit 102 estimates a position and an orientation of the moving object, based on measurement values obtained from the sensor 101. The position/orientation estimation unit 102 further estimates a reliability of the estimated position and orientation value. The position/orientation estimation unit 102 outputs the estimation result to the position/orientation information acquisition unit 111.

The position/orientation information acquisition unit 111 acquires the estimation result input from the position/orientation estimation unit 102 and outputs the acquired estimation result as position/orientation information to the storage unit 112.

The storage unit 112 stores the position/orientation information input from the position/orientation information acquisition unit 111.

The generation unit 113 generates a reliability map based on the position/orientation information stored in the storage unit 112 and outputs the generated reliability map to the determination unit 114.

The determination unit 114 determines an orientation of the moving object, based on the reliability map input from the generation unit 113, and outputs the determined orientation to the control unit 103.

Figure 2:
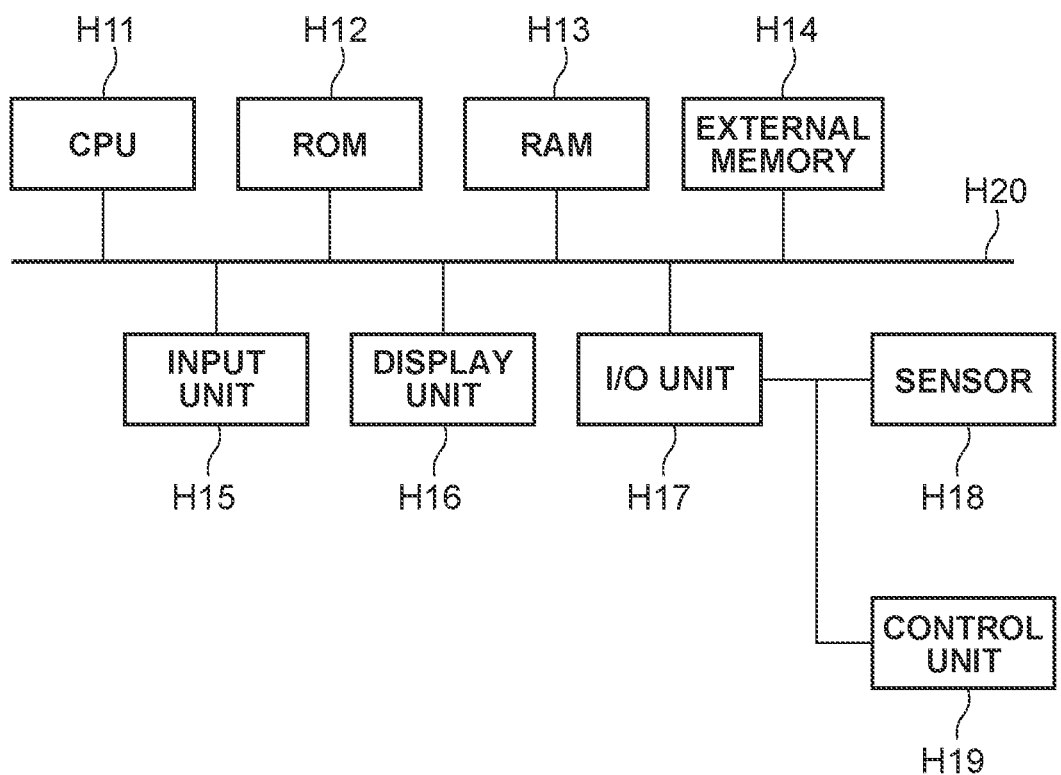
FIG. 2 is a diagram illustrating an example of a hardware configuration of the information processing apparatus according to the first exemplary embodiment.

FIG. 2 is a diagram illustrating a hardware configuration of the information processing apparatus 110. A central processing unit (CPU) H11 controls various devices connected to a system bus H20. A read-only memory (ROM) H12 stores a basic input/output system (BIOS) program and a boot program. A random access memory (RAM) H13 is used as a main storage device of the CPU H11. An external memory H14 stores programs that are processed by the information processing apparatus 110. An input unit H15 includes a keyboard, a mouse, and a robot controller and performs information input processing. A display unit H16 outputs results of calculations by the information processing apparatus 110 to a display device based on instructions from the CPU H11. The display device can be of any type, such as a liquid crystal display device, a projector, or a light emitting diode (LED) indicator. An input/output (I/O) unit H17 as a communication interface performs information communication via a network. The I/O unit H17 can be of any type, such as an Ethernet communication interface, a universal serial bus (USB) communication interface, a serial communication interface, or a wireless communication interface.

To the I/O unit H17, image data is input from a sensor H18. The sensor H18 corresponds to the sensor 101. A control unit H19 corresponds to the control unit 103.

FIG. 3 is a flowchart illustrating a process according to the present exemplary embodiment. The flowchart is realized by the CPU H11 by executing a control program. The process illustrated in FIG. 3 is started in a case where an instruction to start moving the moving object is issued.

In step S101, the information processing apparatus 110 is initialized. Specifically, a program is read from the external memory H14, and the information processing apparatus 110 is shifted to an operable state. Further, a threshold value for the reliability and route information about the moving object that are for use by the determination unit 114 are read into the RAM H13. The route information herein refers to information about routes through which the moving object is to travel, and the route information includes target position coordinates and orientations of the moving object at one or more waypoints set on the routes.

In step S102, a position and an orientation and a reliability that are estimated by the position/orientation estimation unit 102 based on measurement values acquired from the sensor 101 by the position/orientation information acquisition unit 111 are acquired, and the position and the orientation and the reliability that are acquired are output as position/orientation information to the storage unit 112. According to the present exemplary embodiment, the sensor 101 is fixed to the moving object, and the movement and turn of the sensor 101 are linked with the movement and turn of the moving object, and thus the position and the orientation of the moving object match the position and the orientation of the sensor 101. As a method for estimating a position and an orientation using a sensor, a simultaneous localization and mapping (SLAM) technology or the method by Engel et al. (J. Engel, T. Schöps, and D. Cremers. LSD-SLAM: Large-Scale Direct Monocular SLAM. *European Conference on Computer Vision (ECCV)* (2014)) is used. The methods simultaneously perform localization and mapping over a large-scale environment. A position and an orientation and a reliability are obtained as a result of an estimation by SLAM. According to the present exemplary embodiment, a reliability is calculated based on the number of feature points extracted from images captured by the sensor 101 and a uniformity of a distribution. The more the feature points are uniformly distributed, the higher the reliability becomes. A low reliability is obtained in a case where feature points are biased and the number of feature points included in a specific region is small. The storage unit 112 stores positions and orientations and reliabilities that are previously estimated by the position/orientation estimation unit 102. The position/orientation information is array data containing each pair of a position and an orientation and a reliability as one element.

In step S103, the generation unit 113 generates a reliability map for orientations of the moving object with respect to each position in a space, based on the position/orientation information that is previously output from the position/orientation information acquisition unit 111 and is stored in the storage unit 112. A method by which the reliability map is generated will be described below.

In step S104, the determination unit 114 determines an orientation, based on the route information read into the RAM H13 and the reliability map generated by the generation unit 113, such that the reliability becomes higher than or equal to the threshold value stored in the RAM H13 during the control of the movement of the position of the moving object. Details of an orientation determination method will be described below.

In step S105, the orientation of the moving object is controlled to match with the orientation determined by the determination unit 114.

In step S106, whether the entire process of the information processing apparatus 110 is to be ended is determined.

Specifically, the entire process is ended in a case where the input unit H15 receives an end instruction from the user (YES in step S106). Otherwise (NO in step S106), the processing returns to step S102 to continue the process.

FIG. 4 is a flowchart illustrating a process of generating the reliability map in step S103. According to the present exemplary embodiment, the moving object is moved on a two-dimensional plane, and an orientation that can be designated by the movement control is a turn around a vertical axis.

Figure 5A:
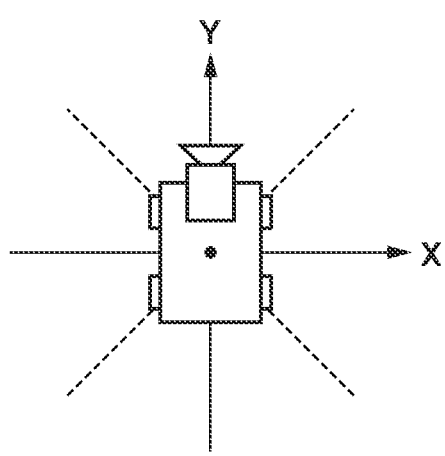
FIGS. 5A to 5D are diagrams illustrating a method for generating a reliability map according to the first exemplary embodiment.
Figure 5B:
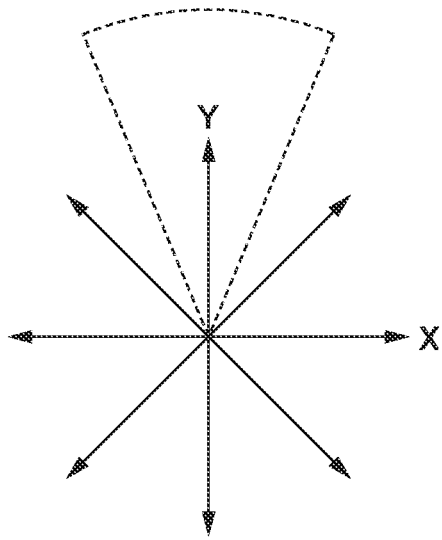

In step S201, an orientation of the moving object at a position (x, y) on the two-dimensional plane are divided by an angle. Specifically, the orientation is divided into eight regions formed by dividing each quadrant between X- and Y-axes by 45 degrees as illustrated in FIG. 5A. In FIG. 5B, an area in a dotted frame indicates an angle range of the orientation obtained as the positive Y-axis direction by the dividing.

Figure 5C:
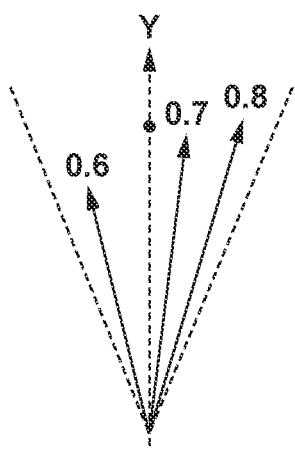

In step S202, a representative value of reliabilities is calculated for each divided orientation. First, from among combinations of a position and an orientation and a reliability stored in the storage unit 112, combinations of orientations and reliabilities of positions that is within a predetermined range from the position (x, y) are acquired. Then, with respect to each orientation, an average value of the target reliabilities is calculated. For example, in a case of the positive Y-axis direction, reliabilities within the angle range of the dotted frame in FIG. 5B are target reliabilities and, in a case where three reliabilities of 0.6, 0.7, and 0.8 are the target reliabilities as illustrated in FIG. 5C, a representative value of the reliabilities is an average value of 0.7. The reliabilities are, in a case of using an angle θ formed between an orientation and a positive X-axis direction, reliabilities with respect to positions and orientations within a range of the angle θ, θ=67.5 degrees to 112.5 degrees, for example.

Figure 5D:
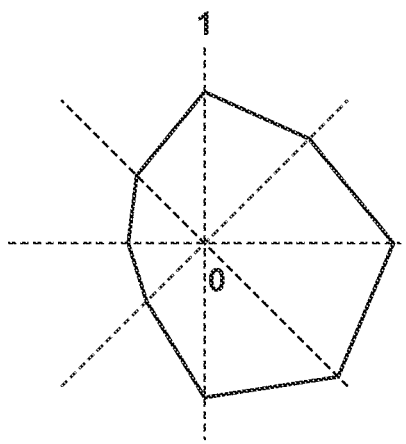

In step S203, whether the calculation of a representative value of the reliabilities for all the orientations in step S202 is completed. All the orientations refer to all the divided orientations, e.g., all the eight arrows in FIG. 5B. In a case where the calculation for all the orientations is completed (YES in step S203), the processing proceeds to step S204. On the other hand, in a case where the calculation for all the orientations is not completed (NO in step S203), the processing returns to step S202. As a result of completing the calculation of a representative value of the reliabilities for all the orientations with respect to the position (x, y), a reliability map for each orientation of the moving object as illustrated in FIG. 5D is obtained. In FIG. 5D, the reliabilities for the divided orientations are plotted with an origin point at 0 and a maximum value at 1, and adjacent reliabilities are connected by a solid line.

In step S204, whether the generation of a reliability map for each orientation for all the positions of the positions and the orientations that are stored in the storage unit 112 is completed is determined. In a case where the generation is completed (YES in step S204), the process ends. On the other hand, in a case where the generation is not completed (NO in step S204), the processing returns to step S201 to continue the process.

The reliability maps for orientations of the moving object with respect to the respective positions in the space are generated as described above.

Next, the orientation determination method in step S104 will be described below.

An orientation of the moving object is determined based on the route information read into the RAM H13 and the reliability maps generated by the generation unit 113 in step S103.

With respect to each position on a route through which the moving object is to travel, the reliability of a predetermined orientation and the threshold value stored in the RAM H13 are compared based on the reliability map for orientations. In a case where the reliability is higher than the threshold value, the predetermined orientation is not changed. On the other hand, in a case where the reliability is lower than the threshold value, the predetermined orientation is changed to an orientation based on the reliability map such that the reliability becomes higher than or equal to the threshold value.

A specific example will be described below with reference to FIG. 5D. For example, at the position (x, y), orienting the camera in the positive X-axis direction increases the reliability according to the reliability map for orientations of the moving object in FIG. 5D. Thus, the positive X-axis direction is determined as the orientation of the moving object at the position (x, y). The determined orientation is output to the control unit 103 to reflect the determined orientation in the movement control of the moving object.

Figure 6:
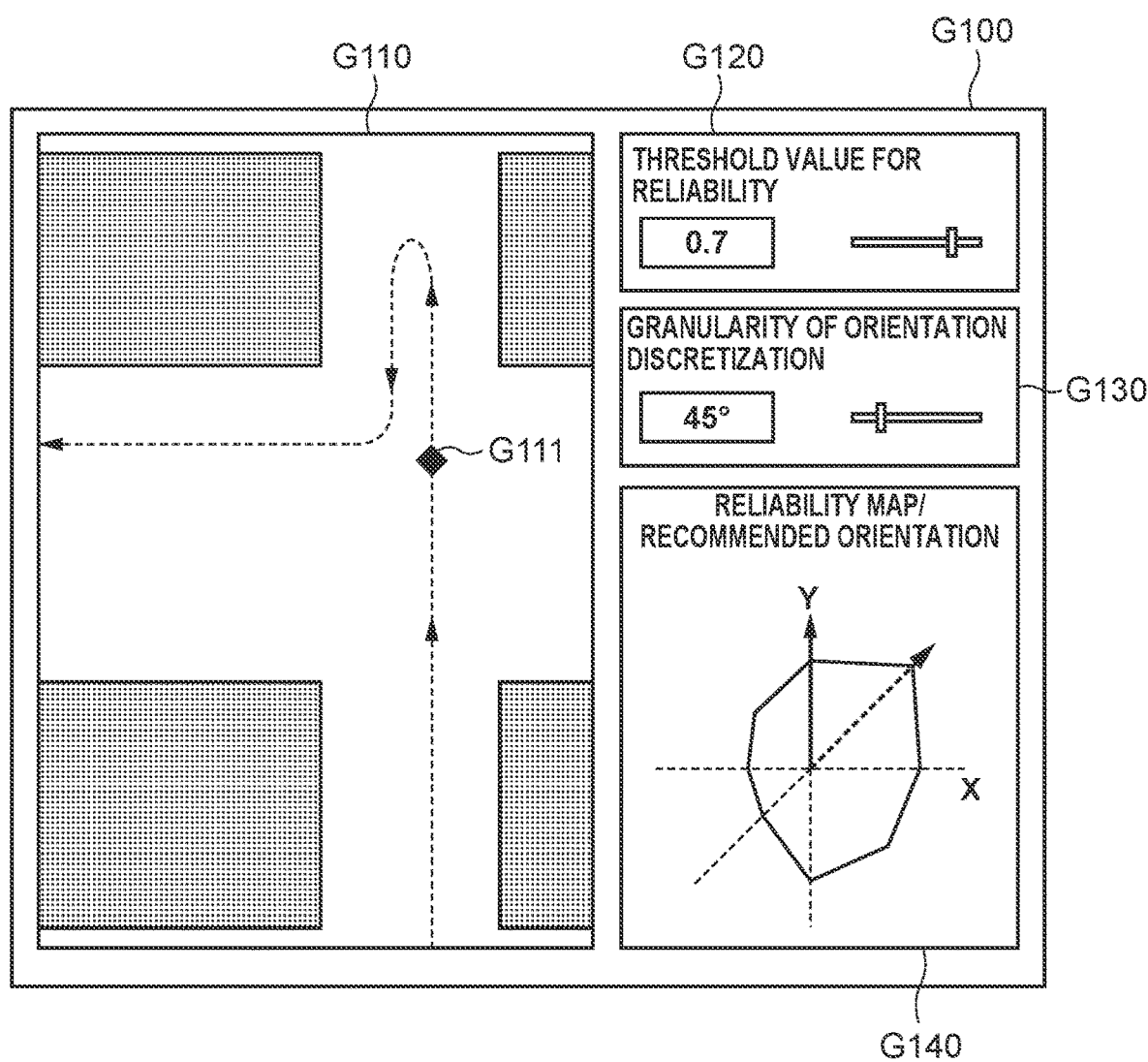
FIG. 6 is a diagram illustrating a graphical user interface (GUI) of the information processing apparatus according to the first exemplary embodiment.

According to the present exemplary embodiment, the orientation determined by the determination unit 114 can be checked and edited by the user using a graphical user interface (GUI). FIG. 6 illustrates an example of a GUI G100 presented by a presentation unit 104. The GUI G100 receives parameters designated by the user.

A horizontal plane G110 indicates a top view of a coordinate space of a travel route of the moving object.

A dotted arrow indicates the travel route. A position G111 indicates a position on the route that is currently selected by the user.

A slider included in a field G120 is used to set a threshold value of the reliability for use in determining an orientation of the moving object by the determination unit 114. The determination unit 114 determines an orientation of the moving object such that the reliability becomes higher than or equal to the set threshold value.

A slider included in a field G130 is used to set a granularity of orientation discretization in the reliability map generation by the generation unit 113. In FIG. 6, a value for dividing by 45 degrees as in FIGS. 5A to 5D is set.

In a field G140, the reliability map generated by the generation unit 113 and the orientation determined by the determination unit 114 are visualized. The displayed reliability map is a reliability map for each orientation of the moving object at the position G111, which is currently designated by the user. On the reliability map, the orientation of the moving object that is currently set is indicated by a solid arrow, and the orientation of the moving object that is determined by the determination unit 114 is indicated by a dotted arrow. In this example, the moving object is recommended to be oriented diagonally rightward by 45 degrees while traveling at the position G111.

With the GUI G100 illustrated in FIG. 6, the user can visually recognize the reliability map for orientations of the moving object and the orientation of the moving object that is determined based on the reliability map.

With the information processing apparatus 110 that performs self-localization using the camera attached to the moving object according to the first exemplary embodiment, the moving object travels stably even in an environment where the accuracy of position and orientation measurements decreases.

Modified Example 1-1

According to the first exemplary embodiment, the position/orientation information acquisition unit 111 acquires positions and orientations that are estimated by a SLAM technology using the sensor 101, and a reliability is calculated based on the number of feature points extracted from images captured by the sensor 101 and the uniformity of the distribution. The present exemplary embodiment is not limited to those described above, and a sensor that estimates a position and an orientation and a reliability can be used in combination with a SLAM technology. A position and an orientation and a reliability can be estimated using an active distance sensor, such as a time-of-flight sensor and a pattern light projection sensor, in combination with a SLAM technology. Further, any reliability calculation methods by which accuracy values and stability values of positions and orientations are calculable can be used. For example, an accuracy value and a stability value can be calculated based on a difference in luminance between a captured image and a temporally previous image.

Methods for the estimation are not limited to SLAM methods, and any methods that estimate a position and an orientation and a reliability can be used. For example, a method based on measurements of radio wave intensities in wireless communication, such as Wi-Fi communication, can be used. Further, a method using a satellite positioning system, such as Global Positioning System, a method using a magnetic tracking sensor, or a method using a detection time difference between many optical sensors can be used. Further, a method using model fitting based on computer-aided design (CAD) data using images acquired by a camera, such as a monitoring camera, installed at a specific position can be used.

Further, methods for the position/orientation information acquisition are not limited to the estimation method using a sensor, and any methods for estimating a position and an orientation and a reliability without using a sensor can be used. For example, a virtual position and a virtual orientation are set, and a reliability is calculated based on the number and distribution of feature points that can be observed at the set virtual position and orientation.

Modified Example 1-2

According to the first exemplary embodiment, the generation unit 113 uses averaging as a method for calculating a representative value of reliabilities for each orientation of the moving object. Methods for the calculation of a representative value of reliabilities are not limited to the above-described method, and any methods for calculating a representative value of reliabilities can be used. For example, a median value of reliabilities can be used as a representative value. Further, a method that calculates a reliability of a position and an orientation at an angle closest to a reference angle for each orientation using nearest neighbor interpolation and uses the calculated reliability as a representative value can be used. Further, a method that calculates a weighted average of reliabilities using a magnitude of an angle formed by an orientation reference angle and an angle of an orientation of a moving object as a weight and uses the calculated weighted average as a representative value can be used.

Further, while the orientation of the moving object is discretized and a reliability is calculated for each discretized orientation according to the present exemplary embodiment, any methods that calculate a reliability for each orientation without discretization can be used. For example, a method that uses a closest value to a current position and a closest value to a current orientation of the moving object among the positions and the orientations and the reliabilities that are stored in the storage unit 112 can be used. Further, a method that calculates a reliability for each orientation by a function approximation, such as a spline approximation, can be used.

Modified Example 1-3

According to the first exemplary embodiment, the determination unit 114 determines an orientation based on the reliability map such that the reliability becomes higher than or equal to the predetermined value during the control of the movement of the moving object along the travel route. Methods for the orientation determination are not limited to the above-described method, and any methods that determine an orientation such that a reliability becomes higher than or equal to the predetermined value can be used. For example, an orientation can be determined based on a total of reliabilities at a plurality of time points instead of a reliability of a position and an orientation at a single time point. A specific method is as follows. In a case where the reliability map for orientations of the moving object indicates the fact that a high reliability can be maintained while the moving object is turned by 180 degrees rightward in comparison to a case where the moving object is turned leftward, the moving object is turned rightward.

Modified Example 1-4

While the control unit 103 controls the movement of the moving object such that the orientation of the moving object matches the orientation determined by the determination unit 114 according to the first exemplary embodiment, a control target is not limited to that described above and can be anything to match the orientation of the sensor 101 with a desired orientation. For example, the sensor 101 attached to the moving object can be turned using an electric head without changing the orientation of the moving object. Alternatively, a method that turns the moving object and turns the sensor 101 can be used.

Modified Example 1-5

According to the first exemplary embodiment, a wheeled robot that moves on a two-dimensional plane is described as an example of an application of the moving object system 100. Applications are not limited to this example, and the moving object system 100 is also applicable to a flight robot that moves in a three-dimensional space. In this case, the three position/orientation parameters according to the first exemplary embodiment are extended to six parameters in total including three position parameters (X, Y, Z) and three orientation parameters (roll, pitch, yaw), and the generation unit 113 generates a reliability map by discretizing the three orientation parameters with respect to each position (x, y, z).

Modified Example 1-6

According to the first exemplary embodiment, the orientation determined by the determination unit 114 is presented using the GUI. Methods for the presentation are not limited to that described above, and any methods for presenting the determined orientation can be used. For example, in a case where the moving object includes a direction instruction light for every 45 degrees, the orientation determined by the determination unit 114 is visualized by turning on the light corresponding to the determined orientation. Anything, such as a light emitting diode (LED) lamp or a liquid crystal display that can present information about the determined orientation to the user can be used. A presentation device can be a speaker that produces a specific alarm sound or a specific melody corresponding to the determined orientation. Information to be presented can be information other than the information about the determined orientation, such as the reliability map generated by the generation unit 113.

SECOND EXEMPLARY EMBODIMENT

According to the first exemplary embodiment, the reliability map for orientations of the single moving object is generated, and a recommended next orientation of the moving object is determined based on the generated reliability map, whereby the moving object can travel stably. According to a second exemplary embodiment, a case where a plurality of moving objects travels simultaneously and camera attachment positions are different among models of the moving objects will be described below as an example. In a method described below, a reliability map is generated for each camera attachment position, and a reliability map of a camera attachment position within a predetermined distance is selected. Then, an orientation of a moving object is determined based on the selected reliability map. In the present exemplary embodiment, vertical direction components of the camera attachment positions are different among the moving objects.

A configuration diagram according to the present exemplary embodiment is similar to the diagram in FIG. 1 illustrating a configuration of the information processing apparatus 110 according to the first exemplary embodiment, and thus the redundant descriptions are omitted. Differences from the first exemplary embodiment are the inclusion of an extraction unit, a process that is performed by the generation unit 113, and a process that is performed by the determination unit 114. Only the differences from the first exemplary embodiment will be described below.

The extraction unit extracts the position/orientation information from the positions and the orientations and the reliabilities that are stored in the storage unit 112 such that vertical direction components of the positions are divided into predetermined ranges. The extraction unit outputs the extracted position/orientation information to the generation unit 113.

The generation unit 113 generates a reliability map for each camera attachment position based on the position/orientation information extracted by the extraction unit and outputs the generated reliability maps to the determination unit 114.

The determination unit 114 selects a reliability map closest to the camera attachment position of the moving object from the reliability maps generated for each camera attachment position by the generation unit 113. The determination unit 114 determines an orientation of the moving object based on the selected reliability map.

FIG. 7 is a flowchart illustrating a process according to the present exemplary embodiment. Redundant descriptions of steps that are similar to the corresponding steps in FIG. 3 illustrating the process that is performed by the information processing apparatus 110 according to the first exemplary embodiment are omitted, and steps that are different from the first exemplary embodiment will be described below.

In step S301, the extraction unit extracts the position/orientation information from the combinations of positions and orientations and reliabilities stored in the storage unit 112 such that the vertical direction components of the extracted positions are divided into different predetermined ranges. The storage unit 112 stores all the previous position/orientation information about the plurality of moving objects having various different camera attachment positions. In a case where camera attachment positions differ greatly from each other, captured images also differ greatly from each other, and the number and distribution of feature points extracted from each captured image vary. As a result, reliabilities may be completely different from each other. Thus, the extraction is performed to extract the position/orientation information of camera attachment positions close to each other, whereby the position/orientation information as input to the reliability map can be limited to the position/orientation information that includes an appropriate reliability.

In step S103, a reliability map for orientations of the moving objects is generated for each camera attachment position based on the positions and the orientations and the reliabilities that are extracted by the extraction unit.

In step S104, the determination unit 114 selects a reliability map closest to a camera attachment position of an orientation determination target moving object from the reliability maps generated for each camera attachment position. The determination unit 114 determines an orientation of the moving object based on the selected reliability map.

According to the second exemplary embodiment, in a case where a plurality of moving objects travels simultaneously and different models of the moving objects have cameras at camera attachment positions different from each other, the plurality of moving objects can travel stably even in an environment where accuracy of position and orientation measurements decreases.

Modified Example 2-1

According to the second exemplary embodiment, the extraction unit uses the position/orientation information extraction method in which the positions stored in the storage unit 112 are compared with the vertical direction components of the camera attachment positions. Methods for the extraction are not limited to the method described above, and any extraction methods that divide the camera attachment positions and extract position/orientation information can be used. For example, an extraction method using a comparison with a camera attachment angle can be used.

Other Exemplary Embodiments

The present disclosure is also realized by performing the following process. Specifically, software (program) for realizing the functions of the above-described exemplary embodiments is supplied to a system or an apparatus via a network or various storage mediums, and a computer (or a CPU or a micro-processing unit (MPU)) of the system or the apparatus reads the program and executes the read program. Further, the program can be recorded in a computer-readable storage medium, and the computer-readable storage medium storing the program can be provided.

The present disclosure enables a moving object to travel stably while preventing a decrease in accuracy of position and orientation estimations during movement of the moving object.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-123979, filed Jul. 29, 2021, which is hereby incorporated by reference herein in its entirety.

What is claimed is:

1. An information processing apparatus comprising:
at least one memory storing instructions; and
at least one processor that, upon execution of the instructions, is configured to operate as:
an extraction unit configured to extract past position and orientation information and information on the reliability of orientation estimation of a moving object, from a storage unit that holds past position and orientation information of a plurality of moving object with different sensor attached positions and information on the reliability of orientation estimation, wherein the past position and orientation information and the reliability information of the moving object are extracted in a case where a difference of the sensor attaching position is within a predetermined range;
a generation unit configured to generate, based on the extracted position and orientation information and information on the reliability, a reliability map indicating the reliability of respective orientation estimations at the current position of the moving object; and
a determination unit configured to determine the orientation of the moving object with the sensor, based on the reliability of respective orientation estimations indicated in the reliability map generated by the generation unit such that the reliability becomes higher than or equal to a predetermined value during control of a movement of the moving object.

2. The information processing apparatus according to claim 1,
wherein the reliability map is a map including the reliability for each discretized orientation of the moving object with respect to a position in a space.

3. The information processing apparatus according to claim 1, wherein execution of the stored instructions further configure the at least one processor to operate as: a display unit, that outputs, to a display device, the orientation of the moving object that is determined by the determination unit.

4. The information processing apparatus according to claim 1, wherein execution of the stored instructions further configure the at least one processor to operate as: a display unit that outputs, to a display device, the reliability map generated by the generation unit.

5. The information processing apparatus according to claim 1, wherein execution of the stored instructions further configure the at least one processor to operate as a control unit configured to control the movement of the moving object such that the orientation of the moving object matches the orientation determined by the determination unit.

6. The information processing apparatus according to claim 1, wherein execution of the stored instructions further configure the at least one processor to operate as: a route acquisition unit configured to acquire a route of the moving object to a predetermined destination; a control unit configured to control a orientation to the orientation determined by the determination unit if the reliability for respective orientation estimations are below a predetermined value at each position included in the route acquired by the route acquisition unit, based on the reliability for each orientation estimations indicated in the reliability map generated by the generation unit.

7. An information processing method comprising:
extracting past position and orientation information and information on the reliability of orientation estimation of a moving object, from a storage unit that holds past position and orientation information of a plurality of moving object with different sensor attached positions and information on the reliability of orientation estimation, wherein the past position and orientation information and the reliability information of the moving object are extracted in a case where a difference of the sensor attaching position is within a predetermined range;
generating, based on the extracted position and orientation information and information on the reliability, a reliability map indicating the reliability of respective orientation estimations at the current position of the moving object; and
determining the orientation of the moving object with the sensor, based on the reliability of respective orientation estimations indicated in the reliability map generated by the generation unit such that the reliability becomes higher than or equal to a predetermined value during control of a movement of the moving object.

8. The information processing method according to claim 7, further comprising: outputting, to a display device, the determined orientation of the moving object.

9. The information processing method according to claim 7, further comprising: outputting, to a display device, the generated reliability map.

10. The information processing method according to claim 7, further comprising controlling the movement of the moving object such that the orientation of the moving object matches the determined orientation.

* * * * *